United States Patent [19]
Holod, Jr.

[11] Patent Number: 5,967,482
[45] Date of Patent: Oct. 19, 1999

[54] SUPPORT SYSTEM FOR CHRISTMAS TREES AND THE LIKE

[76] Inventor: Louis J. Holod, Jr., 2326 Harts Ln., Lafayette Hill, Pa. 19444

[21] Appl. No.: 09/046,097

[22] Filed: Mar. 23, 1998

[51] Int. Cl.⁶ .................................................... B42F 13/00
[52] U.S. Cl. ............................ 248/343; 248/327; 248/60; 47/67
[58] Field of Search .................................... 248/327, 343, 248/323, 317, 60, 59, 74.3, 231.91, 48.1, 200, 581, 589, 614, 61, 209; 362/403; 47/67; 384/202

[56] References Cited

U.S. PATENT DOCUMENTS

| | | | |
|---|---|---|---|
| 3,049,326 | 9/1962 | Otterson | 248/59 |
| 3,284,037 | 11/1966 | Muller et al. | 248/60 |
| 5,657,953 | 8/1997 | Smith | 248/317 |

*Primary Examiner*—Ramon O. Ramirez
*Assistant Examiner*—Willie Berry, Jr.

*Attorney, Agent, or Firm*—Woodcock Washburn Kurtz Mackiewicz & Norris LLP

[57] ABSTRACT

A system for supporting and stabilizing a Christmas tree and the like that includes an anchor secured to an overhead structure, such as the ceiling of a room. A clamp is connected to a portion of the tree, such as the tip of the trunk, and an elongate flexible leash is connected between the anchor and the clamp. The clamp is secured to the tree by encircling its tongue around the tree trunk and then threading the tongue through a retainer formed on the end of the tongue that slidably retains the tongue. The leash is slidably attached to the clamp by means of one or more retainers attached to the clamp. The tongue and the leash have ribs spaced along their lengths. The retainers have deformable members that engage the ribs so as to permit the tongue or leash to slide through the retainer in a first direction during insertion but that prevent the tongue or leash from withdrawing from the retainer by sliding back out in an opposite direction. The system can be used to support and stabilize a Christmas tree that has been placed in an upright position by means of a stand so as to prevent the tree from tipping over, or it can be used to place the tree in the upright position independently of the stand.

17 Claims, 6 Drawing Sheets

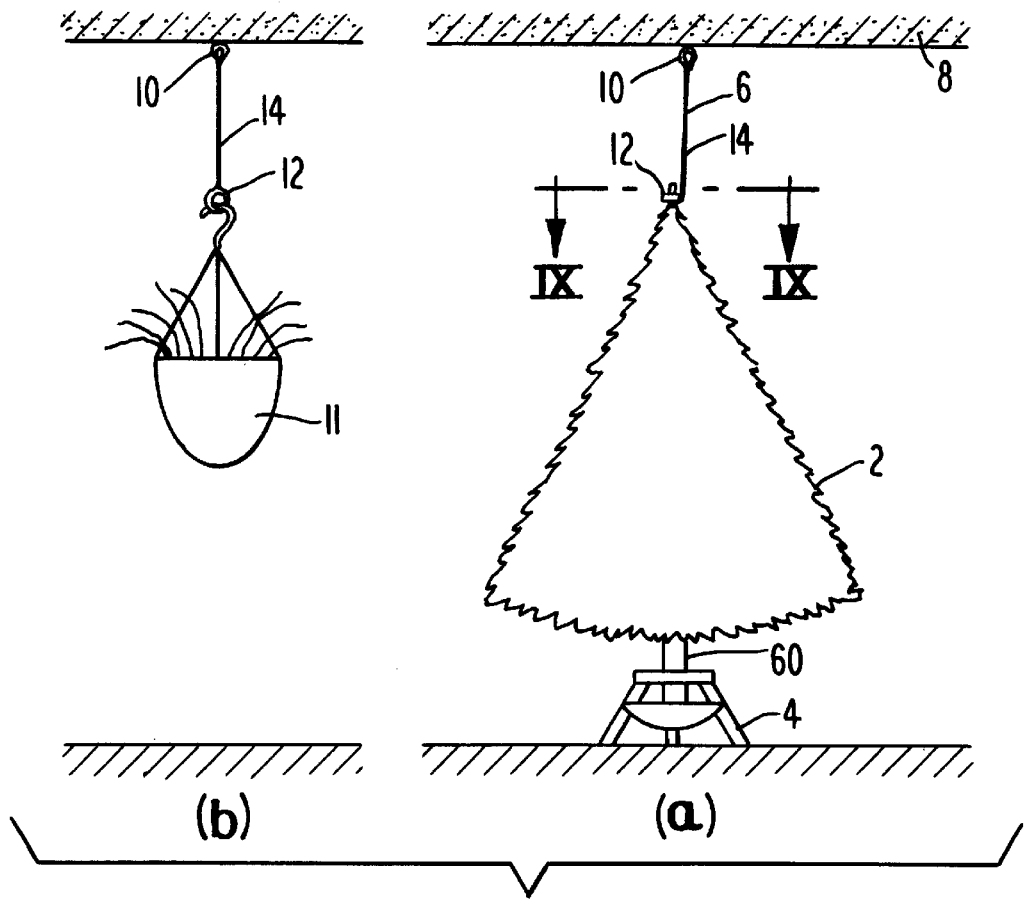
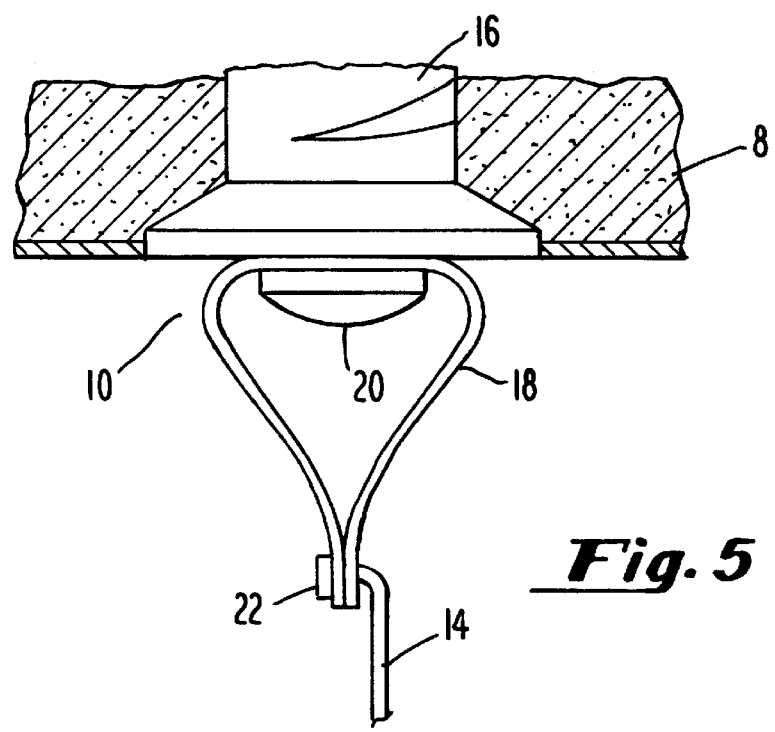

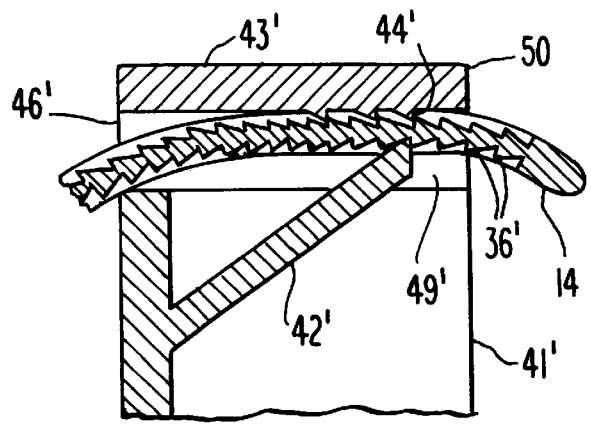
*Fig. 8*
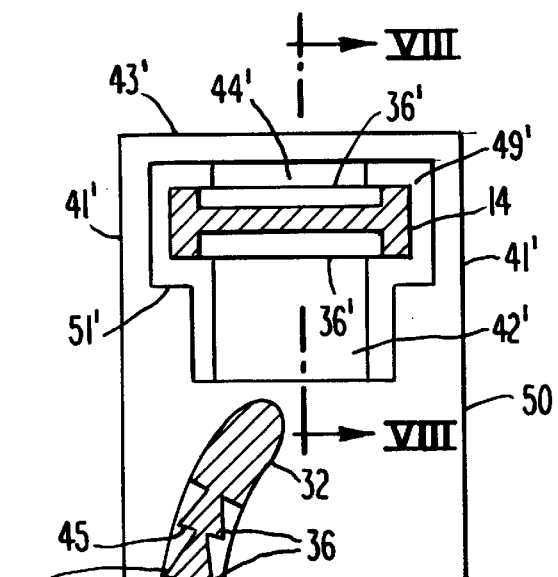
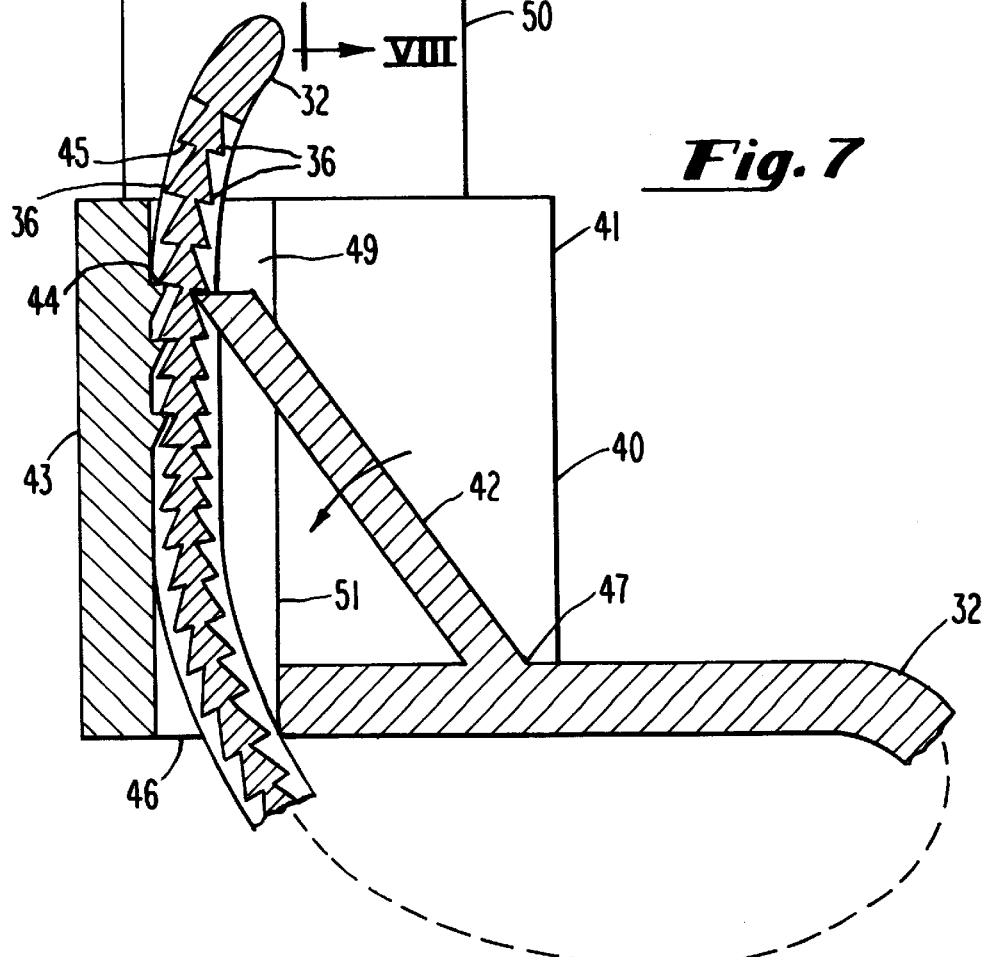
*Fig. 7*

SUPPORT SYSTEM FOR CHRISTMAS TREES AND THE LIKE

FIELD OF THE INVENTION

The current invention is directed to a system for stabilizing and supporting plants and trees and the like. More specifically, the current invention is directed to a system for stabilizing a Christmas tree displayed under an overhead structure and supported on a tree stand.

BACKGROUND OF THE INVENTION

In the past, Christmas trees and the like have been displayed by supporting the base of the tree trunk in a stand or other base. The stand typically comprised a dish, supported by three or four legs, on which the base of the tree trunk rested and a collar attached to the legs and encircling the trunk. A number of screws extended through the collar and engaged the side of the tree trunk.

Unfortunately, orienting the tree into an upright position using such a stand is a difficult and often frustrating process. Further, a tree supported in this manner is susceptible to being tipped over.

Consequently, it would be desirable to provide a system that allowed a tree or the like to be easily oriented in an upright position and securely supported in that position.

SUMMARY OF THE INVENTION

It is an object of the current invention to provide a system that allowed a tree or the like to be easily oriented in an upright position and securely supported in that position. This and other objects is accomplished in a system for supporting, in an upright position, trees and the like displayed under an overhead structure that comprises (i) an anchor having means for being retained in the overhead structure, (ii) a coupling having means for being secured onto the tree, and (iii) a flexible leash extending between the anchor and the coupling.

In a preferred embodiment of the invention, the system further includes means for exerting an upward force on the coupling so as to urge the tree into an upright position. The force exerting means comprises a retainer, having means for slidably retaining the first end of the leash therein, formed on the coupling.

Preferably, the slidable retaining means comprises means for permitting the leash to slide through the retainer in a first direction during insertion therein but preventing the leash from retracting from the retainer in an opposite direction, such as a plurality of ribs formed on the leash and an elastically deformable member having means for engaging the ribs.

BRIEF DESCRIPTION OF THE DRAWINGS

FIGS. 1(a) and (b) are elevation views showing two applications of the support system according the current invention.

FIG. 5 is partial cross-sectional view showing the manner in which the leash is attached to FIG. 6 is an isometric view of the retainers formed on the clamp, with the end of the strap portion of the clamp and the end of the leash shown in phantom.

FIG. 7 is a section taken along line VII—VII shown in FIG. 6, showing the retention of tongue and leash.

FIG. 8 is a cross-section taken along line VIII—VIII shown in FIG. 7, showing the retention of leash.

DESCRIPTION OF THE PREFERRED EMBODIMENT

Figure 2:
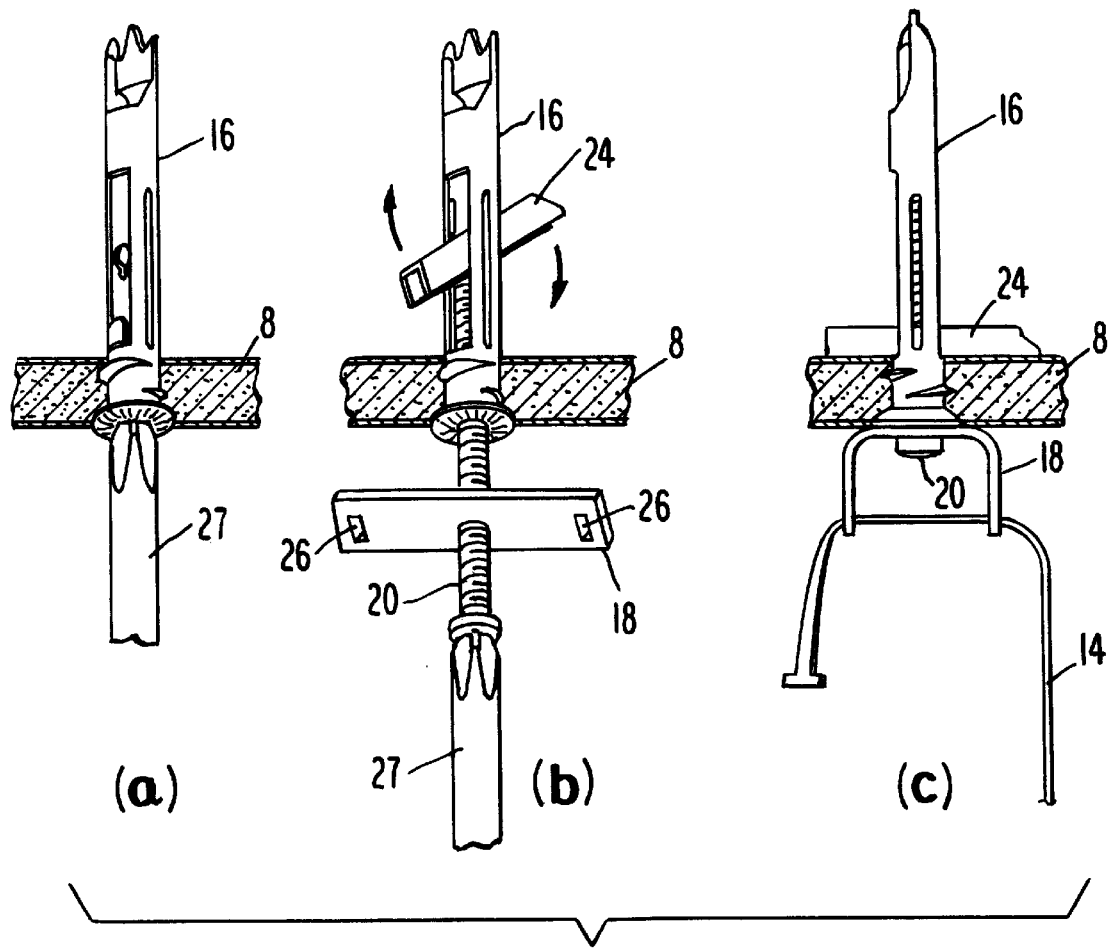
FIGS. 2(a) to (c) are cross-sectional views showing the installation of the anchor portion of the system shown in FIG. 1(a).

A system 6 for supporting a Christmas tree 2 or the like according to the current invention is shown in FIG. 1(a). As shown in FIG. 1(a), the base of the tree trunk 60 is supported in a conventional tree stand 4, although other types of stands or base supports could also be utilized. According to the current invention, the top of the tree is supported and stabilized by the support system 6, which connects the top of the tree trunk 60 to the ceiling 8 of the room so as to maintain the tree in the upright position.

As shown in FIG. 2, installation of the support system 6 begins by installing an anchor system 10 into the ceiling 8. As illustrated in FIG. 2, the ceiling 6 is constructed of drywall or plaster board. Consequently, the anchor system 10 comprises a convention toggle screw 16. It will be readily appreciated, however, that other types of anchors could also be used, such as wood screws, masonry screws, expansion bolts, etc., depending on the construction of the ceiling or other overhead structure.

As shown in FIG. 2(a) a screw driver 27 is used to thread the anchor 16, which is preferably self-threading, into the ceiling 8. Alternatively, a hole for the anchor could be pre-drilled. After the anchor 16 is installed, a mounting strap 18 is slipped over a screw 20 and the screw threaded into the anchor, as shown in FIG. 2(b). The mounting strap 18 is preferably formed from a strip of flexible plastic in which holes 26 have been formed adjacent its ends. As also shown in FIG. 2(b), the threading of the screw into the anchor 16 causes the toggle arms 24 to extend into the horizontal position, as is conventional in toggle screws. Continued threading of the screw 20 into the anchor 16 causes the toggle arms 24 to be pulled snugly against the upper surface of the ceiling 8 so that the ceiling is clamped between the toggle arms and the head of the screw 20, thereby firmly securing the anchor to the ceiling, as shown in FIG. 2(c). As also shown in FIG. 2(c), after the anchor is secured, the ends of the mounting strap 18 are bent downward and a flexible leash 14 is threaded through the holes 26.

Figure 4:
FIG. 4 is a plan view of the leash shown in FIG. 1(a).

The flexible leash 14, which is preferably made from plastic, is shown in detail in FIG. 4. In the preferred embodiment, the leash 14 comprises a long, flexible, narrow strip of plastic on which an enlarged head 22 is formed. The leash 14 should be sufficiently long to reach from a ceiling to the top of a Christmas tree and is preferably about four feet long. Ribs or serrations 36' are preferably formed along one or both sides of the leash 14. The ribs 36' are preferably similar to those conventionally found in ties used to secure or bundle electrical wires and are discussed more fully below in connection with the clamp 12.

Figure 3:
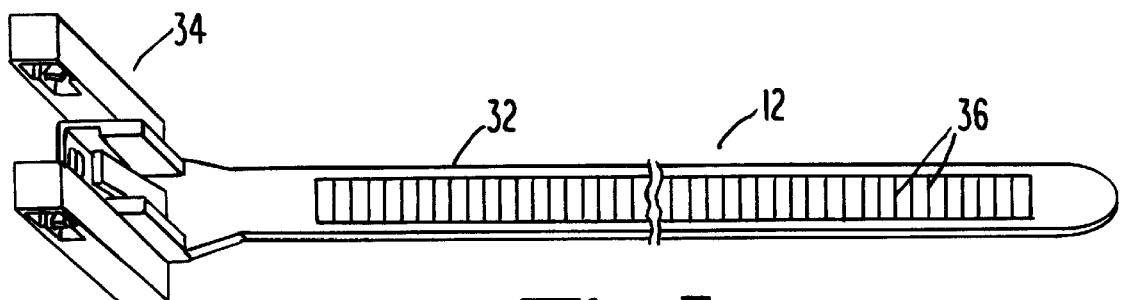
FIG. 3 is a plan view of the clamp shown in FIG. 1(a).

After the anchor 16 is attached to the ceiling 8 and the leash 14 is attached to the anchor, a clamp 12 is attached to a portion of the tree, preferably the tip of the tree trunk, as shown in FIGS. 1 and 6–9. The clamp 12 serves as a coupling that connects the leash 14 to the tree 2. The clamp 12 is preferably formed from plastic and, as shown in FIG. 3, is comprised of a flexible elongate tongue 32 to which a connector portion 34 is attached at one end. As shown in FIGS. 3 and 7, a large number of transversely extending ribs or serrations 36 are closely spaced along a major portion of the length of the tongue 32. Preferably, the ribs 36 are formed on both sides of the tongue 32 and have faces 45 that face toward the connector portion 34 and extend outward at an angle of 90° or less to the surface of the tongue, as shown in FIG. 7. Preferably, the ribs 36 are of the type conventionally formed on electrical ties.

Figure 6:
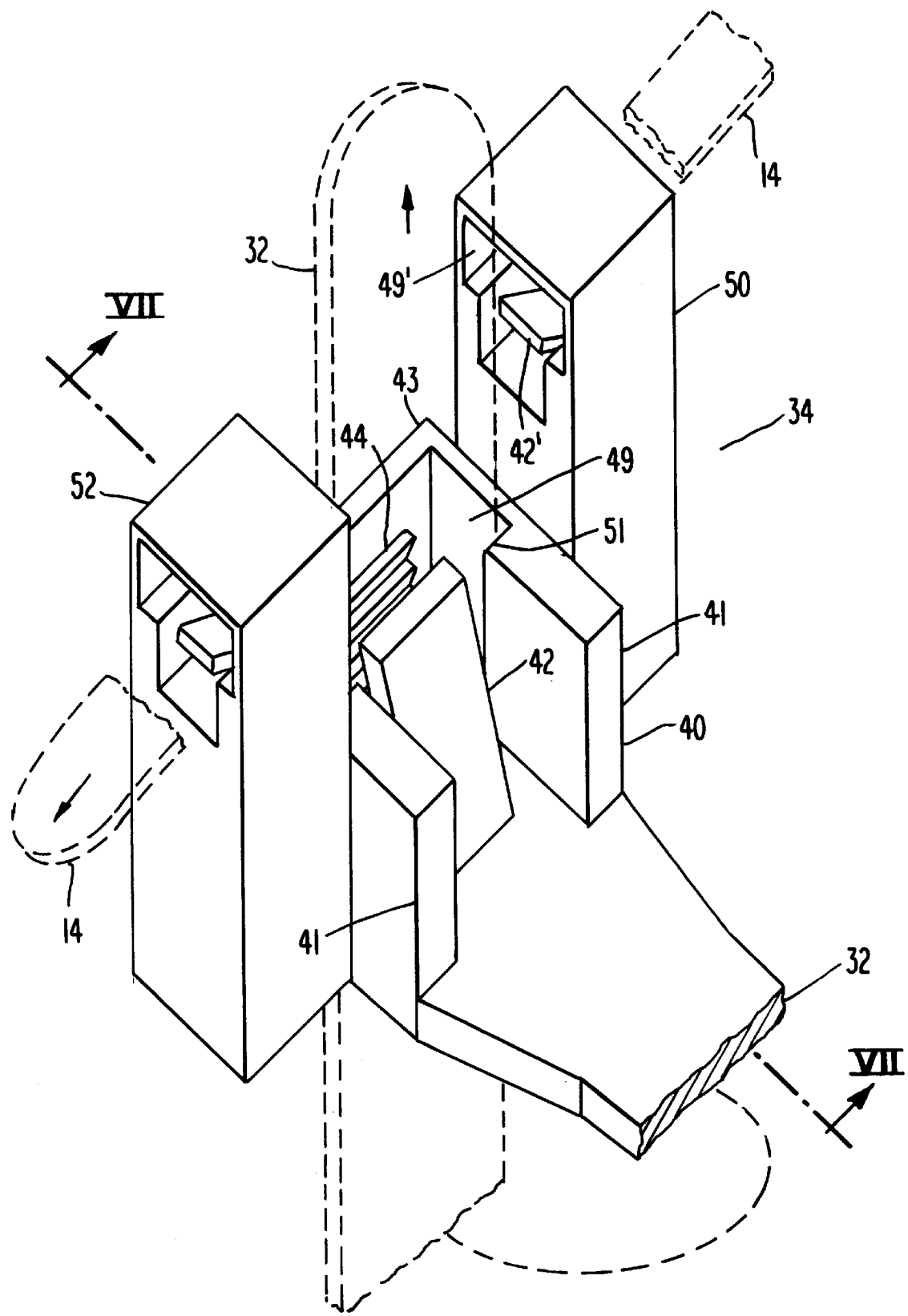

The connector portion 34, which is shown in detail in FIGS. 6–8, comprises three substantially similar retainers 40, 50 and 52. The retainer 40, which cooperates with the tongue 32, is formed by a pair of side walls 41 connected by a back wall 43. An opening 46 is formed is the portion of the tongue 32 that extends between the walls 41 and 43. The opening 46 and the walls 41, 43 form a passage 49 that extends past a deformable member 42, discussed in detail below. A number of ribs or serrations 44 are formed on the inside surface of the back wall 43. The ribs have faces that face away from the tongue 32 and may be similar to the ribs 36 formed on the tongue. A shelf 51 is formed on the inner surface of each of the side walls 41 and serves to guide the tongue 32 through the passage 49, as discussed below.

A deformable member 42, which is preferably integrally formed with the tongue 32, extends outwardly from the portion of the tongue 32 disposed between the side walls 41. The member 42 is biased toward the back wall 43 so that in its undeformed state its distal end contacts, or is located close, to the back wall. However, the member 42 is deformable in that it can, with the application of moderate force, be bent back (i.e., rotated clockwise in FIG. 7) so as to rotate about hinge 47, which is formed where the member connects to the tongue 32. The member 42 is preferably sufficiently flexible so that such deformation is elastic. Thus, the member 42 responds to being bent back away from the back wall 43 by exerting an opposing spring force that urges it back toward the back wall.

Figure 9:
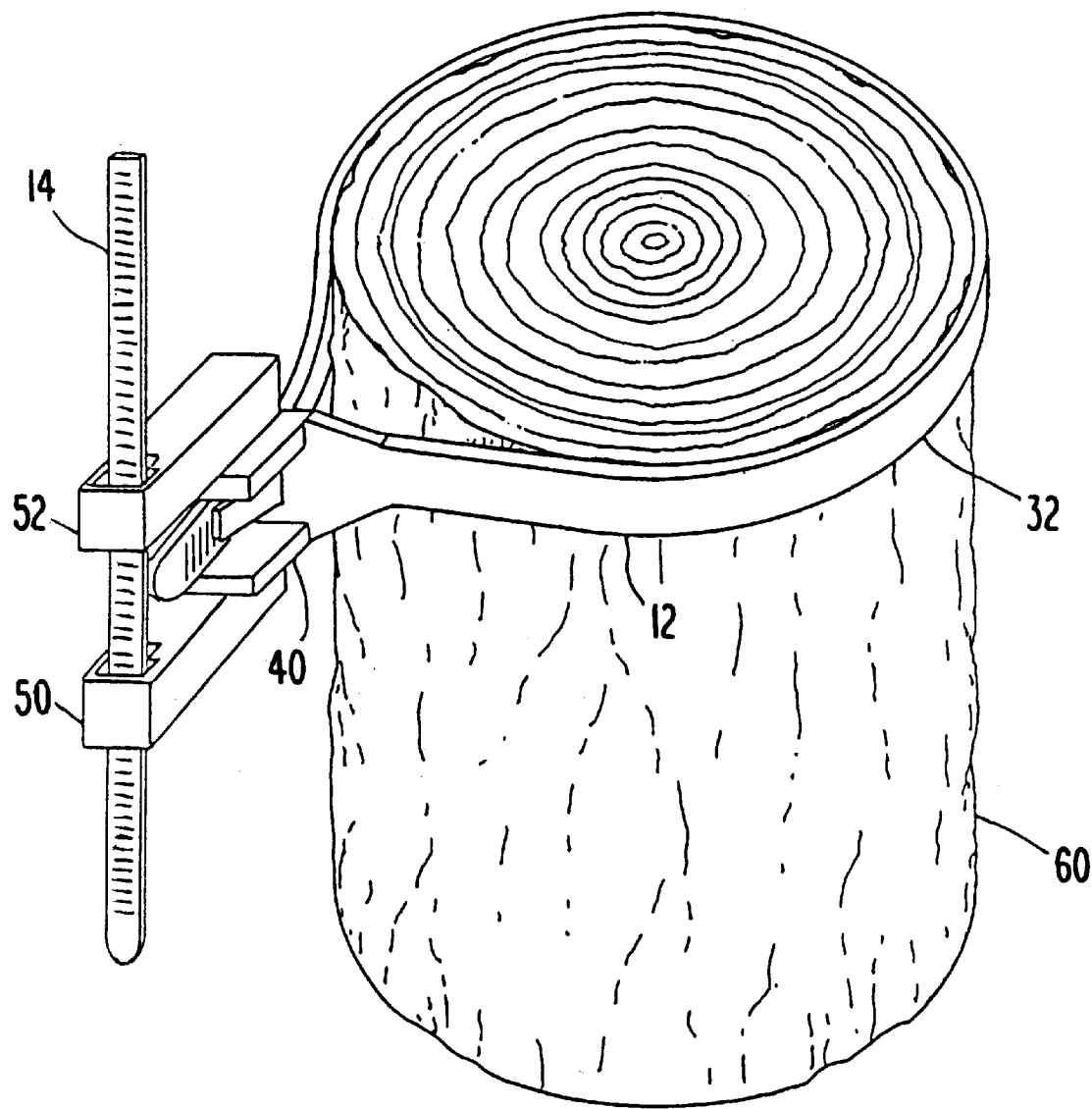
FIG. 9 is a cross-section taken along line IX—IX shown in FIG. 1(a), showing the clamp installed on the tree trunk and the leash retained in the clamp.

At installation, after the tongue 32 is made to encircle the tree portion 60, as shown in FIG. 9, its distal end is threaded through the opening 46 and then slid through the passage 49, thereby causing the deformable member 42 to be bent backward along the hinge 47. The tongue 32 is then pulled through the passage 49 until it tightens on the tree portion 60, thereby securely attaching the clamp 12 to the tree, as shown in FIG. 9. Note that, as shown in FIG. 7, the elastically created opposing spring force exerted by the deformable member 42 urges the tongue 32 toward the back wall 43 so that the tongue is captured between the back wall and the distal end of the deformable member. Consequently, the ribs 36 formed in the tongue 32 are engaged by both the ribs 44 formed in the back wall 43 and the distal end of the deformable member 42. As a result of the orientation of the faces of the ribs, the tongue 32 is effectively locked in the retainer 40. As can be readily appreciated, the retainer 40 and tongue 12 cooperate so that the tongue can readily slide through the retainer in a first direction (i.e., upward in FIG. 7) during insertion but cannot slide back out of the retainer in the opposite direction. In general, subsequent removal of the clamp 12 from the tree portion 60 will require severing the tongue 12 or the tree. Although the preferred embodiment of the tongue retainer 40, as well as the leash retainers 50 and 52 discussed below, incorporate ribs or serrations, other types of slidable retainers could also be utilized for the tongue and leash retainers, such as set screws or other devices that relied primarily on friction to prevent withdrawal. Alternatively, various types of clamps, such as band clamps, could also be utilized provided that they can adequately prevent the clamp from sliding up the tree, or the leash from sliding out of the clamp, when the leash is tensioned, as discussed below.

As shown best in FIGS. 6 and 8, the connector portion 34 of the clamp 12 preferably also includes two identical leash retainers 50 and 52, although a single leash retainer could also be utilized. Preferably, the leash retainers 50 and 52 are integrally formed on the side walls 41 of the tongue retainer 40 so as to form a compact arrangement. The leash retainers 50 and 52 preferably extend outward substantially perpendicular to the surface of the tongue 32. As shown in FIG. 8, each of the retainers 50 and 52 features a passage 49' similar to passage 49 in the tongue retainer 40, discussed above, except that the passages 49' are oriented perpendicularly to passage 49. In addition, each retainer 50 and 52 has a deformable member 42' similar to deformable member 42, ribs 44' similar to ribs 44, shelves 51' similar to shelves 51, and side walls 41' and a back 43' wall similar to the side and back walls 41 and 43 of retainer 40.

At installation, after the clamp 12 has been secured to the tree portion 60, the leash 14, which as previously discussed has been attached to the ceiling 8 by the anchor system 10, is inserted into and pulled downward through the leash retainers 50 and 52, as shown best in FIGS. 8 and 9. As shown in FIG. 8, the elastically created opposing force from the deformably member 42' urges the leash 14 toward the back wall 43' so that the leash is captured between the back wall and the distal end of the deformable member. Consequently, the ribs 36' formed in the leash 14 engage both the ribs 44' formed in the back wall 43' and the distal end of the deformable member 42'. As a result of the orientation of the faces of the ribs, the leash 14 is effectively locked in the retainers 50 and 52. As previously discussed in connection with the clamp retainer 40, while the retainers 50 and 52 allow the leash 14 to be easily slid through the passage 49' in the downward direction during insertion (toward the right in FIG. 8), the leash is prevented from withdrawing out of the retainers by sliding upward. After the leash 14 is inserted through the retainers 50 and 52, it is pulled through them until it has been sufficiently tensioned to ensure that the tree remains in the upright position.

The support system 6 according to the current invention can be used by initially orienting the tree in the upright position by means of the tree stand so that the system ensured that the tree does not tip over. Once installed, the tipping of the tree will drive the clamp 12 downward, imparting a downward force that places the leash 14 in tension. This tension creates an opposing upward force on the clamp 12 that prevents the tree from tipping farther.

Figure 10:
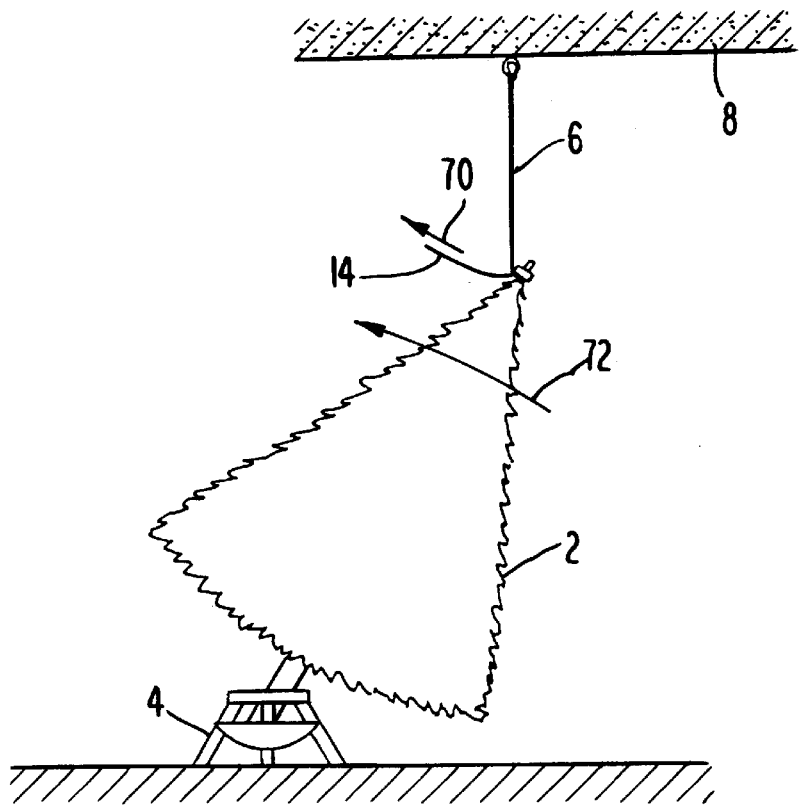
FIG. 10 is a shows a Christmas tree being oriented into the upright position using the system according to the current invention.

Alternatively, the tree could be initially installed in the stand loosely, as shown in FIG. 10, with the tree in an inclined or even in a horizontal orientation. After the leash 14 is attached to the anchor system 12, it is pulled down and threaded through the retainers 50 and 52. Next, the user can either grasp the distal end of the leash 14 and pull it upward, as shown in FIG. 10, or grasp the clamp 12 and push it upward while holding the distal end of the leash down. In either case, this will cause the leash retainers 50 and 52, and therefore the clamp 12, to slide up the leash 14, thereby creating a moment 72 that rotates the tree upward. The leash 14 can be pulled, or clamp 12 pushed, upward until the tree assumes the upright position, as shown in FIG. 1(a). Thus, in addition to ensuring that the tree remains in the upright position, the system 6 according to the current invention can also be used to initially place the tree into the upright position. Moreover, although the system 6 is preferably used to support the top of a tree resting in a tree stand or other base support, so as to prevent it from tipping over, if desired, the stand could be dispensed with and the system used to support the entire weight of the tree so that the tree is suspended from the ceiling.

Although in the preferred embodiment, the leash retainers are attached to the clamp 12, the invention could also be practiced by attaching one or more leash retainers to the anchor system 10. In that event, the leash 14 would be attached to the clamp 12 and then fed upward and slid through the leash retainers. During installation, a downward force exerted on the end of the leash 14 will cause the leash to slide through the retainer, so that the clamp 12, which is attached to the other end of the leash, is pulled upward, thereby urging the tree into an upright orientation.

Figure 11:
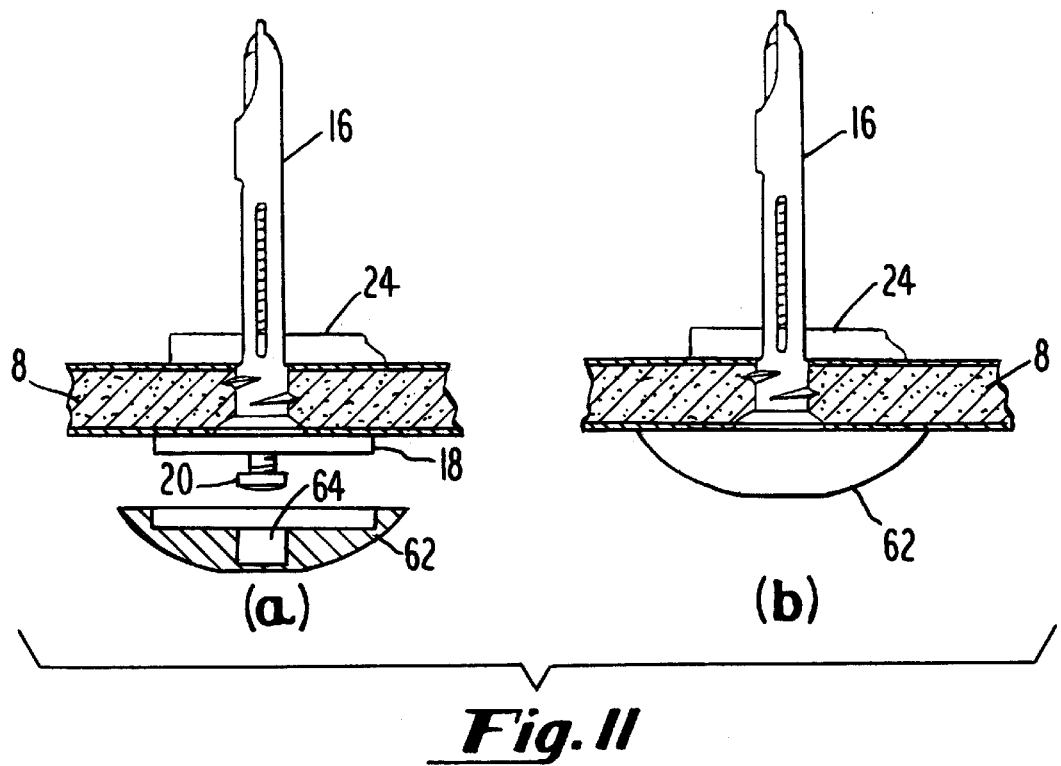
FIGS. 11(a) and (b) show the installation of a decorative cap on the anchor when the support system is not in use.

When it is desired to remove the tree, the leash 14 can severed and discarded. The clamp 12 need not be removed but can be discarded with the tree. The anchor system 10 can be left in place for re-use, for example, the following Christmas. As shown in FIGS. 11(a) and (b), a decorative cap 62 can be installed over the screw 20 of the anchor system 10 by retracting the screw slightly, as shown in FIG. 11(a), and then pressing the cap over the exposed head of the screw, as shown in FIG. 11(b). Preferably, the cap 62 has a recess 64 formed in its underside that retains the cap onto the screw head by means of a friction fit. Thus, the present invention facilitates the use of a permanently installed anchor without creating an unsightly appearance.

Alternatively, after the tree has been removed, a new leash 14 can be installed on the anchor system 10 and a new clamp 12 installed on the leash. The leash can then be used to support a hanging plant 11, as shown in FIG. 1(b).

Although the current invention has been discussed with reference to a Christmas tree, the invention is also applicable for use with other articles that are to be hung from an overhead structure or maintained in an upright position, such as ornamental plants. Also, although the invention has been discussed with reference to securing the tree to the ceiling, the invention can also be utilized in conjunction with other types of overhead support structures. Accordingly, the present invention may be embodied in other specific forms without departing from the spirit or essential attributes thereof and, accordingly, reference should be made to the appended claims, rather than to the foregoing specification, as indicating the scope of the invention.

What is claimed:

1. A system for supporting in an upright position a tree displayed under an overhead structure, comprising:
    a) an anchor having means for being retained in said overhead structure;
    b) a coupling having means for being secured onto said tree; and
    c) a flexible leash extending between said anchor and said coupling, a plurality of projections formed on said flexible leash;
    d) a retainer connected to said coupling for retaining said leash, said retainer having a deformable member adapted to engage said projections formed on said leash, thereby permitting said leash to slide through said retainer in a first direction during insertion therein but preventing said leash from retracting from said retainer in an opposite direction.

2. The support system according to claim 1, wherein said coupling comprises a clamp having a flexible tongue for encircling a portion of said tree.

3. The support system according to claim 2, wherein said tongue has first and second ends, and wherein said clamp further comprises a second retainer attached to said first end of said flexible tongue, said second retainer having means for retaining said second end of said flexible tongue therein.

4. The support system according to claim 1, wherein said overhead structure in which said anchor has means retained is the ceiling of a room.

5. A system for supporting in an upright position a tree displayed under an overhead structure, comprising:
    a) an anchor having means for being retained in said overhead structure;
    b) a coupling having means for being secured onto said tree; and
    c) a flexible leash extending between said anchor and said coupling, said flexible leash having a first end that extends through said coupling;
    d) means for urging said coupling to slide up said flexible leash so as to place said tree in an upright orientation, said means for urging said coupling to slide up said flexible leash comprising a retainer formed on said coupling, said retainer having means for slidably retaining said leash therein, wherein said slidable retaining means comprises means for permitting said leash to slide through said retainer in a first direction during insertion therein but preventing said leash from retracting from said retainer in an opposite direction.

6. The support system according to claim 5, wherein said sliding permitting and preventing means comprises a plurality of ribs formed on said leash.

7. The support system according to claim 6, wherein said sliding permitting and preventing means further comprises an elastically deformable member having means for engaging said ribs.

8. A system for supporting in an upright position a tree displayed under an overhead structure, comprising:
    a) an anchor having means for being retained in said overhead structure;
    b) a coupling having means for being secured onto said tree, said coupling comprising a clamp having a flexible tongue for encircling a portion of said tree, said tongue having first and second ends, said flexible tongue second end having a plurality of ribs formed thereon, said clamp further comprising a first retainer attached to said first end of said flexible tongue, said first retainer having means for retaining said second end of said flexible tongue therein, and wherein said first retainer has deformable means for engaging said ribs, whereby said tongue second end can be threaded through said first retainer and retained therein after encircling said tree trunk; and
    c) a flexible leash extending between said anchor and said coupling.

9. The support system according to claim 8, wherein said leash has first and second ends, and further comprising a second retainer formed on said clamp, said second retainer having means for slidably retaining said first end of said leash therein.

10. The support system according to claim 9, wherein said second retainer extends from said first retainer.

11. A system for supporting in an upright position a tree displayed under an overhead structure, comprising:
    a) an anchor having means for being retained in said overhead structure;

b) a coupling having means for being secured onto said tree, said coupling comprising a clamp having a flexible tongue for encircling a portion of said tree; and c) a flexible leash extending between said anchor and said coupling, wherein said flexible tongue and said leash each have a plurality of ribs formed thereon, and wherein said clamp further comprises first and second retainers, said first retainer having deformable means for slidably engaging said tongue ribs, said second retainer having deformable means for slidably engaging said leash ribs.

12. A system for supporting in an upright position a tree displayed under an overhead structure, comprising:

a) an anchor having means for being retained in said overhead structure, wherein a portion of said anchor is exposed when said anchor is retained in said overhead structure;

b) a coupling having means for being secured onto said tree;

c) a flexible leash extending between said anchor and said coupling; and d) a decorative cap for covering said exposed portion of said anchor.

13. A system for supporting in an upright position a tree displayed under an overhead structure, comprising:

a) an anchor having means for being retained in said overhead structure;

b) a coupling having means for being secured onto said tree; and c) a flexible leash extending between said anchor and said coupling, wherein said flexible leash has a first end; and d) means for causing a force exerted on said first end of said flexible leash to be transmitted to said coupling so that said force pulls said tree into an upright orientation.

14. The support system according to claim 13, wherein said force transmitting means comprises a retainer having means for slidably retaining said leash therein.

15. A system for supporting a tree displayed under a overhead structure in an upright position, comprising:

a) an anchor having means for engaging said overhead structure;

b) a collar for securely encircling a portion of said tree;

c) an elongate member having first and second ends, said first end of said member connected to said anchor, said second end of said elongate member having a plurality of projections formed thereon; and d) a retainer for connecting said second end of said elongate member to said collar, said retainer attached to said collar and having means for slidably retaining said second end of said elongate member therein, said slidable retaining means comprising means for permitting said elongate member second end to slide through said retainer in a first direction during insertion therein but preventing said elongate member second end from retracting from said retainer in an opposite direction, said sliding permitting and preventing means comprising a deformable member adapted to engage said projections formed on said second end of said elongate member.

16. The support system according to claim 15, wherein said elongate member is flexible.

17. A system for supporting a tree displayed under a overhead structure in an upright position, comprising:

a) an anchor having means for engaging said overhead structure;

b) a collar for securely encircling a portion of said tree;

c) an elongate member having first and second ends, said first end of said member connected to said anchor; said elongate member having a length and being flexible;

d) a retainer for connecting said second end of said elongate member to said collar, said retainer attached to said collar and having means for slidably retaining said second end of said elongate member therein, said slidable retaining means comprising means for permitting said elongate member to slide through said retainer in a first direction during insertion therein but for preventing said elongate member from retracting from said retainer in an opposite direction, said sliding permitting and preventing means comprising:

(i) a plurality of ribs formed along at least a portion of said length of said elongate member; and (ii) a deformable member formed in said retainer for engaging said ribs.

* * * * *

UNITED STATES PATENT AND TRADEMARK OFFICE
CERTIFICATE OF CORRECTION

PATENT NO. : 5,967,482
DATED : October 19, 1999
INVENTOR(S) : Holod, Jr.

It is certified that error appears in the above-indentified patent and that said Letters Patent is hereby corrected as shown below:

Column 1, line 63, insert --a-- after the word "is".
Column 1, line 64, insert --the anchor-- after the word "to".
Column 2, line 1, insert --cross-- before the word "section".
Column 2, line 2, insert --the-- before the word "tongue".
Column 2, line 4, insert --the-- after the word "of".
Column 2, line 8, delete the words "is a".
Claim 4, Column 6, line 10, please insert --for being-- after the word "means".

Signed and Sealed this

Fifteenth Day of May, 2001

Attest:

NICHOLAS P. GODICI

Attesting Officer

Acting Director of the United States Patent and Trademark Office